Patented Oct. 6, 1931

1,826,091

UNITED STATES PATENT OFFICE

WILLIAM BEACH PRATT, OF WELLESLEY, MASSACHUSETTS, ASSIGNOR, BY MESNE ASSIGNMENTS, TO DISPERSIONS PROCESS, INC., OF DOVER, DELAWARE, A CORPORATION OF DELAWARE

METHOD OF RECLAIMING WASTE RUBBER AND PRODUCT OF SAME

No Drawing. Application filed February 17, 1926. Serial No. 88,934.

The object of this invention is to provide a method by which scrap vulcanized rubber may be effectively reclaimed in a form in which it may be reused to the best advantage. In obtaining this object it is my purpose further to effect marked economies in the reclaiming process by elimination of many of the steps which have hitherto been regarded as essential. I have succeeded in providing such a process which may be practised for the reclamation of all kinds of scrap vulcanized rubber, including those known to the trade as "shoe stock", "pressure cured boots", "motor truck tires", "auto tires", "inner tubes", "heels", "drug sundries", and the like.

The process may be carried to a point where the reclaimed rubber is dispersed in water with the aid of a suitable hydrophilic colloid, or the process may be carried on only to a point where the rubber is obtained in a mass suitable for any of the uses to which crude rubber is put.

I believe that crude rubber consists of a mass of adhering individual rubber globules, each of which comprises a terpene center, generally considered to be chemically expressed as $(C_5H_8)_n$, and an external film or membrane in the nature of a proteid, and I am further of the opinion that even when crude rubber is subjected to a process of vulcanization, notwithstanding the fact that sulphur is caused chemically to react with the rubber, the rubber globules to a great extent at least preserve their individual identities.

It is known that crude rubber may be swelled either with water or with an organic solvent of the nature of benzol, gasolene or naphtha, or with many of what may be generically termed "the oils", meaning thereby to include not only liquid oils but products which are solid or semi-solid when cold. When rubber is swelled with water, undoubtedly the swelling is caused by the absorption of water by the hydrophilic films or membranes of the globules; and when rubber is swelled with an organic solvent such swelling is undoubtedly caused by the absorption of the solvent by the terpene center of the globules through the proteid film or membrane. These phenomena are also observable in connection with vulcanized rubber.

In carrying out my process of reclaiming vulcanized rubber, as the result of these observations, I have succeeded in reducing the vulcanized rubber to the ultimate particle size notwithstanding the vulcanizing agents and the other foreign bodies which may have previously been incorporated in the rubber at the time of vulcanization.

As an example of how my process may be practised I may recite the following:

Any suitable scrap vulcanized rubber, such as hereinbefore referred to, is first preferably "cracked" on the usual cracking machine and reduced to pieces of fairly small size. While this is not an essential step, it is desirable as it effects a material shortening of the time required for the practise of the process. For example, if the scrap be that which is known as motor truck tires, the tires are passed through the usual cracking machine and preferably ground to pass through a 40 mesh sieve. Or if automobile tires be the initial stock,—such tires usually having therein a certain amount of cotton or like fibrous material,—this stock is cracked and ground until it is fairly well disintegrated. When thus cracked and ground, such a stock is more or less fluffy, and contains fairly long threads or pieces of fabric distributed through the mass. In any event, the first step which I regard as preferable in the practise of my process is that of causing the swelling of the rubber stock by the addition of water. This may be done by placing the stock in a suitable disintegrating apparatus, such, for example, as a ball mill or a Werner & Pfleiderer two-blade mixer. The disintegrating device should be provided with a cover, so that it may be closed, and with means by which it may be heated. Ordinarily the disintegrating apparatus is provided with a steam jacket through which steam may be introduced at a pressure sufficient to furnish the heat which is desirable, or if it can be tightly closed steam may be directly injected therein. The previously disintegrated stock is placed in the mixer, together with water sufficient in amount to effect a thorough wetting of the stock. Ordinarily about 25% by weight of water to the weight of the stock is sufficient for the purpose, and more water can be added as the water boils out of the stock. The mass in the disintegrating apparatus is heated sufficiently to cause more or less violent boiling of the water and the apparatus is set in operation. During the operation of the agitating apparatus the stock is dragged around through the water and through the water vapor or steam generated therefrom, and by rubbing or attrition is reduced in particle size, and consequently presents new surfaces to the rubber particles for the absorption by the particles of the water. During this operation which may take place at or above atmospheric pressure, the entire mass of rubber is swelled, doubtless due to the absorption of water by the proteid films or coatings of the rubber globules. This is further accompanied by the gradual disintegration of the fibrous matter if any be contained in the rubber stock. This operation is continued ordinarily for about half an hour,—in any event sufficiently to cause the exposure of the surfaces of the protective coatings of the globules to water or to water vapor to cause them to absorb water. In this step of my process the swelling of the rubber particles or globules, I believe, greatly reduces the interfacial tension of the globules and correspondingly increases the facial tension of the globules, making it possible for water to enter the inter-globular spaces in the rubber mass.

After this first step is accomplished, the time required therefor being determined by the relative coarseness or fineness of the initially disintegrated stock, I now add to the mass a softener or plasticizer, such as ordinarily employed in the usual processes of reclaiming rubber. Thus I may employ rosin oil, pine tar, cylinder oil, petrolatum, oils of vegetable origin, and in some cases some of the bituminous products, such as a soft asphalt or a so-called "mineral rubber." If the previous disintegration in the presence of water has been carried on in a disintegrating apparatus of the character of a ball mill, the rubber mass is now transferred to a two-blade Werner & Pfleiderer mixer, whereas if the previous disintegrating operation has been carried on in such a two-blade mixer, the remainder of the process may be carried out in such a mixer. I employ a two-blade mixer of the type in which the two helical blades do not come in contact either with each other or with the wall of the casing, and in which the two blades are rotated at different speeds relative to each other, so as to effect a kneading, pulling and stretching operation upon the mass contained in the mixer. Assuming that the softener which is employed in rosin oil, about 10% to 25% by weight thereof to the weight of the vulcanized rubber is added,—the amount of oil of course depending upon the character of the stock and the extent to which it had been cured or vulcanized and the amount of the actual rubber contained in the stock. The oil is placed in the mixer, together with the water-saturated stock, which is still hot, and the mixer is continued in operation to subject the stock to a kneading, stretching and pulling operation while subjected to an elevated temperature. When the operation first commences, the water-saturated stock is in a finely divided condition, but with the absorption of the oil and the evaporation of the water, the mass commences to cohere and as the operation continues, there is finally formed a plastic rubber mass. That is to say, although the mass, at the time of the addition of the oil, is separated into fine particles, yet as the operation proceeds and the mass begins to "make", a point is reached at which a plastic mass is formed which contains minute lumps distributed throughout it. But as the operation is continued and the mass is further subjected to the constant stretching, pulling and kneading operation, these lumps are reduced until the final mass itself consists of adhering particles comparable with the rubber globules of the original crude rubber mass. During this operation the water is gradually evaporated from the mass, and the oil is absorbed (I believe by the terpene centers of the individual globules), so that although there is a tendency for the mass as a whole to reduce or contract owing to the evaporation of the water, nevertheless the mass still remains swollen by reason of the absorption of the oil by the rubber. The time required for this second step of my process, namely, the absorption of the oil while the kneading, stretching and pulling operation is continued, depends upon the character of the stock and the particular oil which is employed. It may take from an hour to five hours, depending upon these factors. During the operation the mass is subjected to heat insufficient to cause "depolymerization" or breaking down of the rubber globules, but preferably to a temperature which is about that of the melting point of sulphur at which vulcanization ordinarily begins to take place.

I have no doubt that in addition to the absorption of oil by the terpene content, a certain quantity of the free sulphur contained in the scrap reacts with the oil, an oil being preferably employed which will permit this reaction to take place. The reason for this is that unless such a reaction takes place, there would doubtless be a further reaction between the free sulphur and the rubber, and a further vulcanization of the rubber, which is a result I desire to avoid, as it is my object to produce a product which is as far as possible comparable with crude rubber. At the conclusion of the operation the mass ordinarily contains about 2% by weight of moisture, but the operation may be continued until substantially all of the water has been removed by evaporation. The mass thus produced is, whole heated, soft and plastic and is then removed from the mixer and rolled into sheets, in which condition it is now available for the various uses to which reclaimed rubber may be put.

I have described so far the simplest manner in which the invention may be practised, but it is capable of various refinements for the accomplishment of additional purposes. For example, during the operation I may remove a certain amount, if not all, of the free sulphur present in the mass by the use of water-soluble re-agents which will unite with sulphur, and after the lumps or conglomerate particles of rubber globules have been pulled out and separated to the $n$th point, I may, at the conclusion of the operation, wash the water-soluble sulphur-carrying re-agent from the mass. It is unnecessary to state all of the various re-agents which may be employed for this purpose, but I may mention several characteristic re-agents, such, for example, as ammonia, certain dibasic acids, such as oxalic, certain of the alkalies, such as caustic soda, etc. Ordinarily a water solution of such re-agents is added to the mass during the first step of the operation in which the mass is being disintegrated and caused to absorb water, and then, after the mass has been caused to absorb oil and has been brought to its final state of plasticity in which there are no longer contained therein conglomerates or lumps, the entire mass may be subjected to a washing operation, while the mass is being kneaded, pulled and stretched for the purpose of removing the re-agent and products of the reaction. In this way I am able substantially to free the product from free sulphur, and by the use of certain of the re-agents, such as oxalic acid, to remove more or less of the sulphur of combination.

One of the results flowing from the operations as hereinbefore described is the total disappearance of such fibrous matter as may have originally been contained in the vulcanized scrap rubber. During these two steps of the operation the fibers apparently are disintegrated to a point where they are no longer of fibrous character, but are of infinitesimal size. Apparently they are reduced to a size even smaller than that of the compounding materials present in vulcanized rubber. In this form they serve merely as an organic filler for the rubber.

Of course it goes without saying that in the event that metal is present in the initial stock, the stock must be treated according to the ordinary methods for the removing of the metal. In fact the raw vulcanized stock may be subjected to the usual preliminary treatments for the removal of foreign materials. This, however, is not a feature of the present invention, as it is one of the ordinary steps which is followed in preparing waste rubber for reclamation processes.

I have hereinbefore adverted to the fact that it is possible to reduce the reclaimed rubber either in the form of a plastic mass which is sheeted or in the form of an aqueous dispersion. While the rubber mass is still in the two-blade mixer, after it has been brought to the condition in which it may be removed from the mixer and sheeted, I may now effect its dispersion in water. In so doing I may employ any suitable hydrophilic dispersing agent, such, for example, as bentonite, wilkinite or other colloidal clay, glue, casein, certain soaps, gels, and the like, which will serve as water carriers and form protective films or coatings about the dispersed rubber particles or globules.

Assuming that the second step of the hereinbefore described operation has been carried on, as stated, in a two-blade mixer of the character described, and that the rubber mass contains either no or a small amount of water, I add sufficient water gradually to the mixer during the stretching and kneading operation to cause the absorption of the water by the rubber mass until the latter contains about 10% by weight of water. I then add to the mass in the mixer the desired quantity of the hydrophilic colloid. The colloid may first be swollen with water if desired or it may be added in dry form. A relatively small quantity of the colloid may be used, in some cases not exceeding 8% to 10% by weight of the rubber. During the kneading and stretching of the rubber mass the hydrophilic colloid is thoroughly incorporated in and distributed throughout the mass, and water is slowly and gradually fed to the mixer, substantially as described in my earlier application Serial No. 662,556, filed September 13, 1923. As the operation continues, the mass first assumes a putty-like appearance as the water is absorbed in the mass of rubber and colloid until finally a change of phase occurs, attendant upon the separation of the particles or globules of rubber from each other in the water medium. In this final condition the particles or globules of rubber are of substantially the same shape and the same order of magnitude as in the original crude rubber utilized in forming the vulcanized rubber which is thus dispersed. More particularly it may be stated as to size, that the rubber globules are substantially the same size as they were in the latex from which the crude rubber is derived, except that they have been slightly swollen by reason of their previous absorption of oil. The ultimate dispersed product as thus formed is a smooth, non-tacky, non-sticky mass of about the consistency of butter, which may be spread in a very thin layer by any suitable instrumentality to form, on the evaporation of the water, a continuous film. The rubber may be readily recovered from the dispersion by coagulation which may be effected as by the addition of a suitable coagulating reagent, or by the evaporation of its aqueous content as described in my application for patent hereinbefore referred to. The rubber coagulum thus recovered from the dispersion has greater strength and elasticity and a much finer texture than vulcanized rubbers which have been reclaimed by the usual processes as hereinafter noted, even excelling in these respects the reclaimed rubber prior to its dispersion. These superior characteristics are doubtless attributable to the substantially non-depolymerizing conditions maintained throughout the recovery processing including the dispersing operation. By dilution with water, the dispersed product may be caused to assume the consistency of cream or of milk.

If it is desired to compound the reclaimed stock, prior to its dispersion, with crude rubber, vulcanizing agents and accelerators, pigments and the like, the plastic mass resulting from the second step of the operation may be removed from the mixer, and passed through compounding rolls while the crude rubber, sulphur and other desired components, are incorporated therein, after which the mass is restored to the mixer and its dispersion in water effected. In some cases, the crude rubber to be added may have the compounding materials added thereto on the compounding roll, and this mass added to the reclaimed stock which has been allowed to remain in the mixer. In other cases the additional components may be separately added to the reclaimed stock in the mixer, and the operation of the latter continued until they are thoroughly and uniformly incorporated in the reclaimed stock, before the mass is dispersed.

From the foregoing it will be seen that starting with scrap vulcanized rubber I may by a continuous process and with the same apparatus and equipment produce an aqueous rubber dispersion. One of the surprising results is that although having the characteristics of normal reclaimed rubber a product produced by my process has greater strength and elasticity, and has a much finer texture than the average product secured from the same class of stock by the known processes. Without attempting to set forth all of the advantages incident to the process I have herein outlined, there are several which deserve mention.

(1) There is no necessity for handling or rehandling the stock during the reclaiming operation, as the stock after having once been placed in a two-blade mixer may remain therein until the final product is produced, whether it be in the form of a plastic mass ready for sheeting, or in the form of an aqueous dispersion.

(2) By this constant kneading, pulling and stretching operation one secures a particle size smaller than that which is produced through refining processes by established reclaiming methods.

(3) The time element is less in relation to heating of the stock than is employed on the average in such prior reclaiming processes, and thereby there is a lesser steam consumption.

(4) The temperature to which the mass is subjected during the operation is lower than that necessary for the known reclaiming operations.

(5) On vulcanizing the reclaimed rubber, the vulcanized product shows higher tensile strength and elongation than comparative stocks reclaimed by present processes.

(6) There is no necessity for removing the cellulose fibers from the stock, inasmuch as the fibers are disintegrated during the process.

There are other advantages which will be appreciated by those skilled in the art.

I do not herein claim the subject matter of certain of my related earlier filed applications, including application Serial No. 657,803, filed August 16, 1923, which discloses and has claims directed to a process of dispersing rubber, and application Serial No. 662,556, filed September 13, 1923, which also discloses and has claims directed to a process of dispersing rubber of crude or reclaimed character, as well as to the dispersed product. The present application deals exclusively with and has claims directed to the processing of waste rubber, which is usually associated with fibrous material, to effect the reclamation of such rubber, and the products obtained therefrom. This application, however, has certain subject matter in common with said last-mentioned application, and contains claims which are in substance divisional claims of that application. For instance, so far as the preparation of dispersions from reclaimed rubber is concerned, one may employ the usual reclaimed rubbers after they have been plasticized by milling or other suitable treatment, as described in that application. The reclaiming of vulcanized rubber by the usual processes, however, e. g., by digestion at elevated temperature and under pressure in caustic soda liquors, results in causing depolymerization of the rubber to a greater or less extent. Consequently, in the preparation of dispersions from reclaimed rubbers, I prefer to employ rubbers which have been reclaimed under substantially non-depolymerizing conditions as herein described. It is to be noted, however, that certain advantages incident to the present invention apply also in the case of vulcanized rubber reclaimed by the usual processes. Thus, for instance, the coagulum of a dispersion of the usual reclaimed rubbers in water also has superior characteristics, for instance, greater strength and elasticity, than such rubbers prior to dispersion.

What I claim is:

1. A process of reclaiming vulcanized rubber stock, which comprises first agitating such stock in the presence of moisture and causing the absorption of moisture thereby to cause a swelling of the rubber particles, and then kneading such moistened stock in the presence of a softener until a plastic mass is formed.

2. A process of reclaiming vulcanized rubber stock, which comprises first agitating such stock in the presence of moisture and at an elevated temperature, thereby causing such stock to absorb moisture, and then kneading such moistened stock in the presence of a softener, thereby causing the absorption of such softener, until a plastic mass is formed.

3. A process of reclaiming vulcanized rubber stock, which comprises first agitating such stock in the presence of moisture and causing the absorption of moisture thereby, and then kneading such moistened stock in the presence of a softener and at a temperature above the boiling point of water until a plastic mass containing little water is formed.

4. A process of reclaiming vulcanized rubber containing fibrous material, which comprises comminuting such stock, agitating and disintegrating such stock in the presence of moisture at an elevated temperature, and then kneading the moistened stock together with a softener at an elevated temperature until the water is evaporated.

5. A process of reclaiming vulcanized rubber stock, which comprises comminuting such stock, agitating such stock in the presence of moisture and causing the rubber to absorb water, adding a softener to the mass and kneading and stretching the same while at a temperature at which sulphur melts, until the mass is substantially free from water.

6. A process of reclaiming vulcanized rubber stock, which comprises comminuting such stock, agitating such stock in the presence of moisture and causing the rubber to absorb water, adding a water-soluble re-agent capable of reacting with sulphur, adding a softener, kneading and manipulating the mixture at a temperature at which sulphur melts, and washing reaction products from the mass.

7. A process of reclaiming waste vulcanized rubber stock, which comprises comminuting such stock, agitating such mass in the presence of moisture at an elevated temperature not below the boiling point of water, thereby causing the rubber particles to absorb water, adding a rubber softener, and kneading and manipulating the mass at such elevated temperature until a non-lumpy plastic mass substantially free from water is formed.

8. A process of reclaiming waste vulcanized rubber containing fibrous materials, which comprises comminuting the waste rubber stock, agitating and disintegrating such stock in the presence of moisture at an elevated temperature, thereby moistening the rubber and fibrous components and destroying the fibers, adding a rubber softener, and kneading and stretching the mass at said elevated temperature until a plastic mass substantially free from water, lumps and visible fibers is formed.

9. A process which comprises incorporating a hydrophilic colloid and water into a mass of reclaimed rubber while maintaining the rubber in continuous phase, adding water to the mass and manipulating it until a change of phase occurs and a dispersion or rubber in water is obtained and coagulating and recovering the rubber from the dispersion.

10. A process which comprises plasticizing reclaimed rubber, incorporating a hydophilic colloid and water in the mass while maintaining the rubber in continuous phase, manipulating the plastic mass and adding water to it until a change of phase occurs and a dispersion of rubber in water is obtained, and coagulating and recovering the rubber from the dispersion.

11. A product consisting of the rubber coagulum of a reclaimed rubber-in-water dispersion, said coagulum having greater strength and elasticity than the reclaimed rubber which was dispersed.

In testimony whereof I have affixed my signature.

WILLIAM BEACH PRATT.